United States Patent [19]

Schneider

[11] Patent Number: 4,666,594
[45] Date of Patent: May 19, 1987

[54] OPEN CELLULAR PUMP FILTER ELEMENT FOR HOMOGENIZATION OF AIR-OIL MIXTURES

[75] Inventor: Karl F. Schneider, Ithaca, N.Y.

[73] Assignee: Borg-Warner Automotive, Inc., Troy, Mich.

[21] Appl. No.: 821,180

[22] Filed: Jan. 22, 1986

[51] Int. Cl.⁴ .................. B01D 19/02; B01D 35/02
[52] U.S. Cl. .................. 210/168; 210/416.5; 210/445; 55/178; 123/593; 261/4
[58] Field of Search ............ 210/168, 416.1, 416.4, 210/416.5, 718, 188, 187, DIG. 5, 445; 55/522, DIG. 13, 159, 178; 261/4, 122, 94, 366, DIG. 65; 123/590, 593, 196 R, 196 A

[56] References Cited

U.S. PATENT DOCUMENTS

| 2,392,901 | 1/1946 | Brown | 210/416.5 |
|---|---|---|---|
| 3,171,820 | 3/1965 | Volz | 260/2.5 |
| 3,295,297 | 1/1967 | Collins | 210/445 |
| 3,377,778 | 4/1968 | Gaertner | 328/233 |
| 3,476,038 | 11/1969 | Dicmas | 417/313 |
| 3,662,887 | 5/1972 | Uhlhorn, Jr. | 210/416.5 |
| 3,732,669 | 5/1973 | Chambers | 55/DIG. 13 |
| 3,784,011 | 1/1974 | Ward | 210/445 |
| 3,811,571 | 5/1974 | Woods et al. | 210/416.5 |
| 4,224,161 | 9/1980 | Anderson et al. | 210/416.5 |
| 4,272,371 | 6/1981 | Moses et al. | 210/416.5 |
| 4,478,607 | 10/1984 | Copps | 123/593 |

FOREIGN PATENT DOCUMENTS

| 2445165 | 8/1980 | France | 55/DIG. 13 |
|---|---|---|---|
| 7807269 | 1/1980 | Netherlands | 55/DIG. 13 |
| 907236 | 10/1962 | United Kingdom | 55/DIG. 13 |

OTHER PUBLICATIONS

"Scott Industrial Foam", Technical Bulletin, published by Foam Division, Scott Paper Company, 6 pages.

Primary Examiner—Richard V. Fisher
Assistant Examiner—Wanda L. Millard
Attorney, Agent, or Firm—James A. Geppert

[57] ABSTRACT

An open cellular pump filter element which is utilized in an oil filter interposed between a sump and an oil pump for an automatic transmission wherein the cellular element breaks up large congregated air bubbles that normally form on a filter screen type mesh and are subsequently released into the suction fluid passage of the pump. An open cellular block of a foam-like material is placed in the filter body after the filter screen.

4 Claims, 3 Drawing Figures

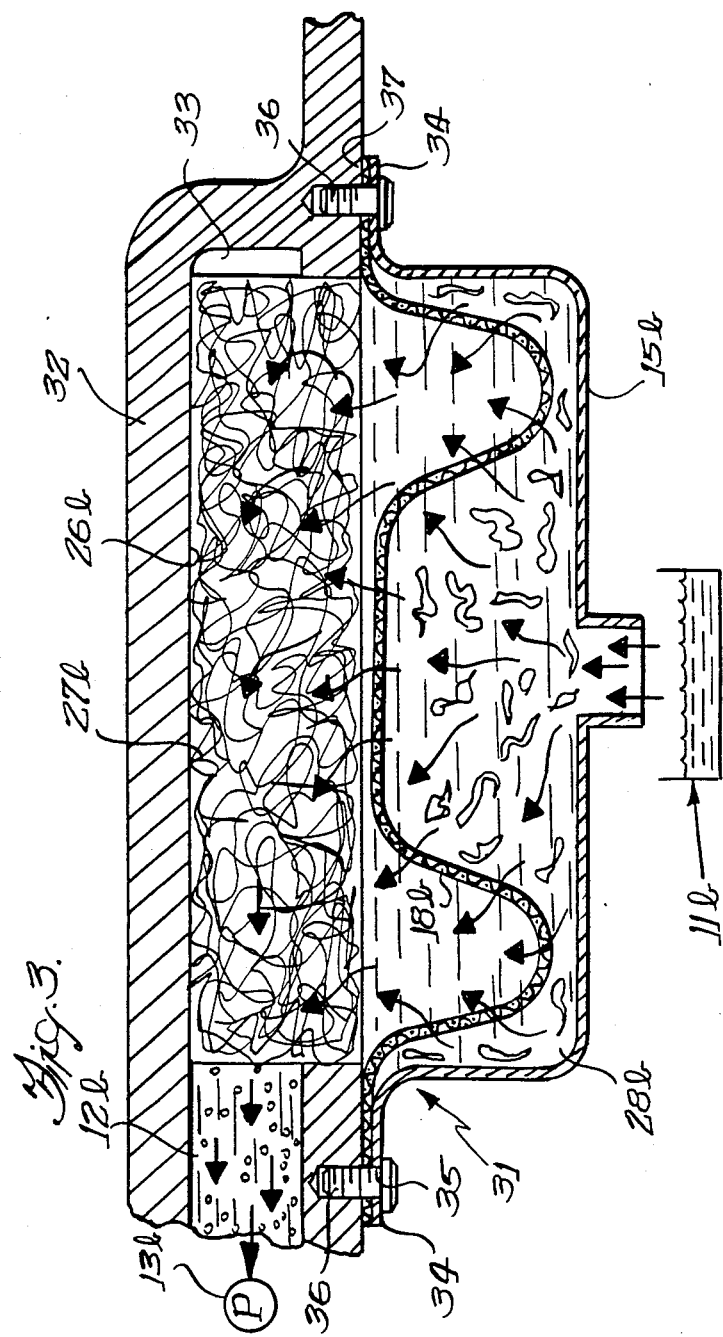

OPEN CELLULAR PUMP FILTER ELEMENT FOR HOMOGENIZATION OF AIR-OIL MIXTURES

BACKGROUND OF THE INVENTION

The present invention relates to an improved filter for oil flow from the sump of a transmission to the oil pump supplying oil to an automatic transmission. Presently utilized oil filters consist of a fine mesh strainer or bag extending across a filter housing with a housing input from the oil sump on one side of the strainer and a housing outlet on the opposite side communicating with the suction fluid passage leading to a transmission oil pump. As air is entrained in the oil circulating through the automatic or continuously variable transmission, air bubbles tend to form along the fine mesh screen in the filter due to reduced pressure therein resulting from the suction side of the oil pump. The bubble size increases as vacuum increases and these large air bubbles pass through the screen and are released into the suction passage leading to the pump mixed with the oil.

Large air bubbles create a condition that is most critical in variable displacement vane pumps running at minimum displacement, but the condition is present in all automatic transmission systems using an enclosed filtration system. Where the large air bubbles are released and pass through the variable displacement pump under minimum displacement, such as occurs in the minimum ratio range of a continuously variable transmission or in the top ratio range of an automatic transmission, a periodic release of the hydraulically-actuated drive system is experienced causing a neutral condition due to premature hydraulic element release. The present invention overcomes this problem.

SUMMARY OF THE INVENTION

The present invention relates to an improved oil filter construction that acts to ensure a homogeneous supply of aerate oil without large air bubbles entrained in the oil flow. The pump filter interposed between the source of oil and the suction passage of the transmission oil pump includes upper and lower housing portions having a fine mesh strainer or filter screen extending across the filter at the juncture between the two housing portions. An inlet is formed in the lower housing portion and an outlet in the upper portion, and the upper housing portion above the filter screen is substantially completely filled with an open cellular foam material acting to homogenize air bubble size.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 3 is a cross sectional view through an alternative embodiment of oil filter.

DESCRIPTION OF THE PREFERRED EMBODIMENT

Figure 1:
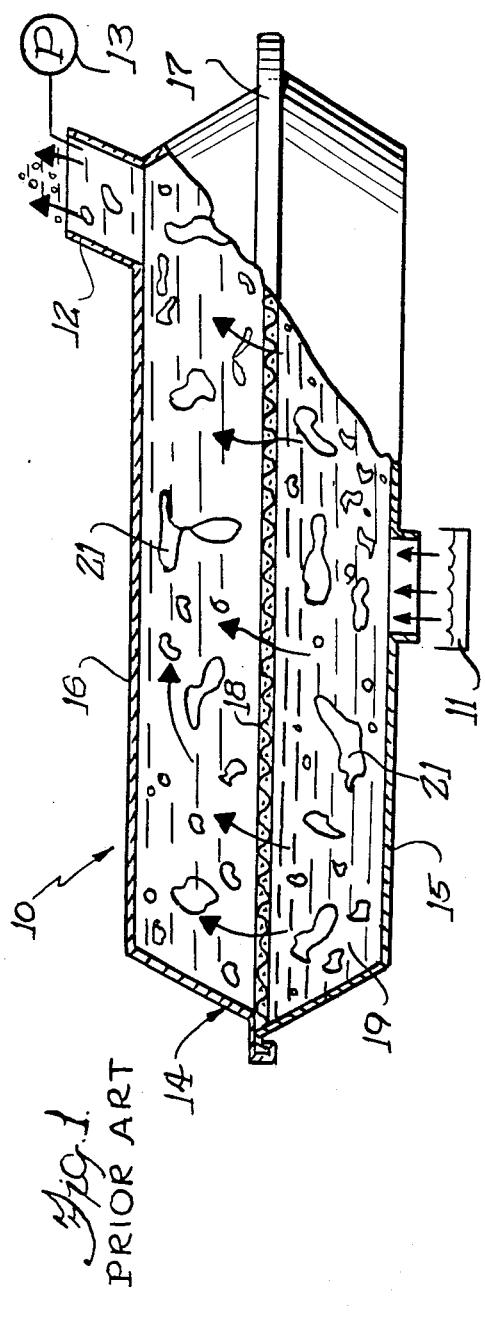
FIG. 1 is an elevational view partially in cross section, of a conventional transmission oil filter.

Referring more particularly to the disclosure in the drawings wherein is shown an illustrative embodiment of the present invention, FIG. 1 discloses a conventional oil filter 10 interposed between the source or sump 11 for the oil for the transmission (not shown) and the suction fluid passage 12 leading to an oil pump 13, such as a variable displacement vane pump or gear pump, for an automatic transmission or continuously variable transmission.

The oil filter 10 consists of a housing 14 formed of a lower dish-like member 15 and an upper inverted dish-like member 16 which are suitably sealingly joined together along an intermediate seam or joint 17. A fine mesh strainer or filter screen 18, formed of a plastic material and/or metal wire mesh material, extends across the housing 14 and is secured therein at the joint 17 between the members to screen out and retain any foreign particles or impurities present in the oil from the source 11.

In an enclosed filtration system, air becomes entrained in the oil during flow through the transmission system. As the oil reaches the filter screen 18, large air bubbles 21 form in the oil-air mixture 19 due to reduced pressure created by operation of the pump 13 and the surface tension of the air bubble. The bubble size increases as vacuum increases in relation to the surface tension and the vacuum in which it exists due to pump suction, and the air bubbles 21 above the filter screen 18 are released into the suction intake passage 12 leading to the pump. When the large air bubbles pass through the pump under minimum displacement, such as for the minimum ratio range of a continuously variable transmission or the top ratio range of a conventional automatic transmission, a periodic release of the hydraulically actuated drive system is experienced resulting in a neutral condition due to premature hydraulic element release.

Figure 2:
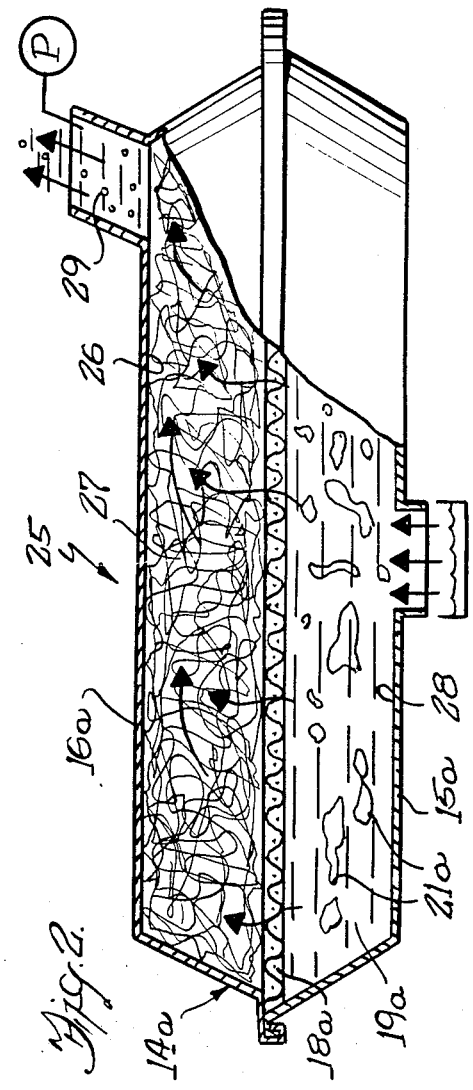
FIG. 2 is an elevational view, partially in cross section, similar to FIG. 1, of the present invention showing the addition of an open cellular material.

FIG. 2 discloses the improved oil filter 25 of the present invention wherein identical elements will be denoted by the same reference numerals with the addition of a script a. This filter includes a housing 14a formed of a lower member 15a, an upper member 16a, and a filter screen 18a extending centrally across the housing. The housing chamber 26 above the filter screen 18a is filled with an open cellular homogenization material 27, such as a commercially available industrial foam material impervious to oil and high temperatures. The block of foam material has approximately ten pores per inch and sufficient thickness so as to provide approximately ten levels of non-aligned openings with the dimensions of a single opening being approximately 0.187 inch. Such a foam material is available from the Foam Division of the Scott Paper Company and is characterized as a reticulated, fully "open pore" flexible, ester type of polyurethane foam.

Thus, large air bubbles 21a which form in the oil-air mixture 19a in the lower chamber 28 due to reduced pressure and pass through the filter screen 18a into the open cellular foam 27 are broken up and dispersed due to the open cellular foam 27 to provide a homogeneous mixture of oil and small bubbles 29 of a size smaller than the size of any single opening in material 27, which air-oil mixture will not provide problems either in the pump or in the hydraulically actuated drive system. Although the Scott industrial foam has been disclosed for use in the filter, obviously other similar materials will also provide the same result in the oil filter.

FIG. 3 discloses an alternative filter structure where the filter 31 is built into a recess 33 formed in a cast housing 32, such as the transmission housing. A lower filter housing member 15b has a circumferential mounting flange 34 with openings 35 to receive bolts 36 to secure the member to the cast housing 32. A suitably configured screen 18b is located in the member 15b with its periphery 37 clamped between the housing 32 and flange 34; a suitable sealing ring (not shown) being positioned to be clamped by the housing flange 34. A block of cellular foam 27b is positioned to substantially fill the upper chamber 26b defined by the recess 33 and the screen 18g. An inlet from the sump 11b in the lower member 15b communicates with the lower chamber 28b, and the suction fluid passage 12b to the pump 13b is formed in the cast housing 32. This arrangement operates in the same manner as the embodiment of FIG. 2.

I claim:

1. In an open cellular dispersion element interposed between an oil filter and an oil pump of an automatic transmission communicating with a source of oil, comprising an oil filter including a filter housing having means defining an inlet communicating with the source of oil and means defining an outlet communicating with a suction fluid passage leading to the oil pump and a filter screen in said housing dividing the filter into an inlet chamber and an outlet chamber, the improvement comprising an open cellular dispersion element substantially completely filling said outlet chamber to break up large air bubbles forming in said filter housing and homogenize the air/oil mixture prior to entering said pump.

2. An oil filter as set forth in claim 1, wherein said open cellular dispersion element is formed of a flexible polyurethane foam having approximately ten pores to the inch.

3. An oil filter as set forth in claim 2, in which said pores in the foam material have an opening size of approximately 0.187 inch.

4. An oil filter as set forth in claim 3, in which said foam material is impervious to oil and temperature.

* * * * *